(12) United States Patent
Arulraj et al.

(10) Patent No.: US 11,030,121 B2
(45) Date of Patent: Jun. 8, 2021

(54) APPARATUS AND METHOD FOR COMPARING REGIONS ASSOCIATED WITH FIRST AND SECOND BOUNDED POINTERS

(71) Applicant: Arm Limited, Cambridge (GB)

(72) Inventors: Daniel Arulraj, Austin, TX (US); Lee Evan Eisen, Round Rock, TX (US); Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 165 days.

(21) Appl. No.: 16/055,240

(22) Filed: Aug. 6, 2018

(65) Prior Publication Data
US 2020/0042464 A1 Feb. 6, 2020

(51) Int. Cl.
*G06F 12/00* (2006.01)
*G06F 12/14* (2006.01)
(Continued)

(52) U.S. Cl.
CPC ........ *G06F 12/1441* (2013.01); *G06F 9/3004* (2013.01); *G06F 9/30007* (2013.01); *G06F 9/3012* (2013.01); *G06F 9/342* (2013.01); *G06F 9/35* (2013.01); *G06F 12/00* (2013.01); *G06F 12/0223* (2013.01); *G06F 12/0284* (2013.01); *G06F 12/0292* (2013.01); *G06F 12/04* (2013.01); *G06F 12/06* (2013.01); *G06F 12/0615* (2013.01); *G06F 12/1483* (2013.01); *G06F 2212/1052* (2013.01)

(58) Field of Classification Search
None
See application file for complete search history.

(56) References Cited

U.S. PATENT DOCUMENTS 6,604,155 B1 * 8/2003 Chong, Jr. ............ G06F 3/0613
709/231

* cited by examiner

*Primary Examiner* — Midys Rojas
(74) *Attorney, Agent, or Firm* — Nixon & Vanderhye, P.C.

(57) ABSTRACT

An apparatus and method are provided for comparing regions associated with first and second bounded pointers to determine whether the region defined for the second bounded pointer is a subset of the region defined for the first bounded pointer. Each bounded pointer has a pointer value and associated upper and lower limits identifying the memory region for that bounded pointer. The apparatus stores first and second bounded pointer representations, each representation comprising a pointer value having p bits, and identifying the upper and lower limits in a compressed form by identifying a lower limit mantissa of q bits, an upper limit mantissa of q bits and an exponent value e. A most significant p−q−e bits of the lower limit and the upper limit is derivable from the most significant p−q−e bits of the pointer value. Mapping circuitry is used to map the lower limit mantissas and upper limit mantissas of the first and second bounded pointer representations to a q+x bit address space comprising $2^x$ regions of size $2^{n1}$, where n1 is the value of n determined when using the exponent value of the first bounded pointer representation. Mantissa extension circuitry extends the lower limit and upper limit mantissas for each bounded pointer representation to create extended lower limit and upper limit mantissas comprising q+x bits, where a most significant x bits of each extended limit mantissa are mapping bits identifying which region the associated limit mantissa is mapped to. The determination circuitry then determines whether the region for the second pointer is a subset of the region for the first bounded pointer by comparing the extended lower and upper limit mantissas.

15 Claims, 16 Drawing Sheets

(51) Int. Cl.
*G06F 9/30* (2018.01)
*G06F 12/02* (2006.01)
*G06F 9/35* (2018.01)
*G06F 12/04* (2006.01)
*G06F 12/06* (2006.01)
*G06F 9/34* (2018.01)

$n = q+e = 20+e$ in example where mantissas are 20 bits creation of p-bit limit value (PASS CASE)

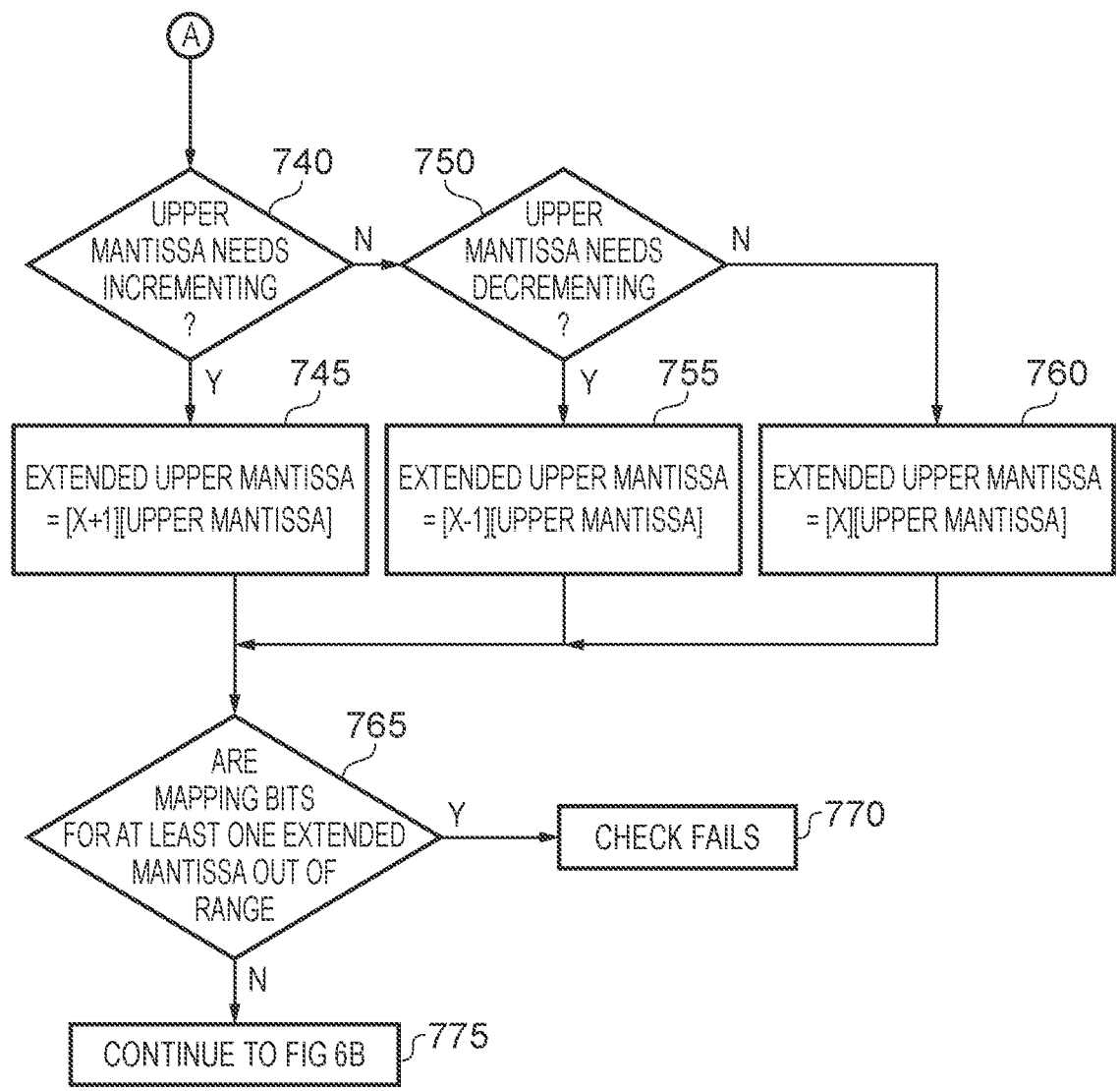
FIG. 10B (Contnued)

EXAMPLE BOUNDARY CHECK SCENARIOS

```
* *PASS **
|                        |
|                        |
|d820000000000000 |=====================================|
|                        |
|                        |
|---- d81dc69000000000 ------| mlimit
|                        |
|                        |
|d81dc69000000000 |_____|
|                        |
|                        |
|                        |
|------ d8088603fffb5995 ------| nlimit
|                        |
|                        |
|------ d8088603fff2bfc0 ------| <--nptr
|                        |
|                        |
|------ d8088603fff26b15 ----| nbase
|                        |
|                        |
d8088603fff00000 |_____|
|                        |
|                        |
|------ d803d2d6c6c21842 ------ -| <--mptr
|                        |
|                        |
d803d2d6c6c00000 |_____|
|                        |
|                        |
|---- d803c42000000000 ------| mbase
|                        |
|                        |
d800000000000000 |=====================================|
|                        |
|                        |
```

FIG. 12B

APPARATUS AND METHOD FOR COMPARING REGIONS ASSOCIATED WITH FIRST AND SECOND BOUNDED POINTERS

BACKGROUND

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

The use of bounded pointers enables hardware enforced fine grained memory protection within address spaces. In particular, when the pointer is used to generate a memory address, it can then be checked whether the memory address is within the allowable range of addresses for the pointer, and then prevent the access proceeding if that is not the case.

Within systems that use such bounded pointers, it can be necessary to check whether an accessible memory region defined for a second bounded pointer is a subset of an accessible memory region defined for a first bounded pointer, and indeed in some architectures an instruction may be specified that is used to trigger such a check. However, for space efficiency reasons, it is often the case that the range information association with a bounded pointer is stored in a compressed format. Whilst the compressed range information could be decompressed in order to recreate the full range information used to define the accessible memory region for each pointer, this can have significant power and area implications, which will typically make that option unattractive in situations where the decompressing of the range information is being performed solely so that it can be checked whether the accessible memory region for one bounded pointer is a subset of the accessible memory region for another bounded pointer.

Accordingly, it would be desirable to provide a more efficient mechanism for performing such a check.

SUMMARY

In one example configuration, there is provided an apparatus to determine whether an accessible memory region defined for a second bounded pointer is a subset of an accessible memory region defined for a first bounded pointer, each bounded pointer having a pointer value and associated upper and lower limits identifying the accessible memory region for that bounded pointer, the apparatus comprising: storage circuitry to store a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where a most significant p−q−e bits of the lower limit and the upper limit is derivable from the most significant p−q−e bits of the pointer value such that the upper and lower limits are anchored by the pointer value to reside within a memory region of size $2^n$, where n=q+e; mapping circuitry to map the lower limit mantissas and upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p; mantissa extension circuitry to extend the lower limit mantissas and upper limit mantissas for each bounded pointer representation to create extended lower limit and upper limit mantissas comprising q+x bits, where a most significant x bits of each extended limit mantissa are mapping bits identifying which region the associated limit mantissa is mapped to; and determination circuitry to determine whether the accessible memory region defined for the second bounded pointer is a subset of the accessible memory region defined for the first bounded pointer by comparing the extended lower and upper limit mantissas for the first and second bounded pointers.

In another example configuration, there is provided a method of determining whether an accessible memory region defined for a second bounded pointer is a subset of an accessible memory region defined for a first bounded pointer, each bounded pointer having a pointer value and associated upper and lower limits identifying the accessible memory region for that bounded pointer, the method comprising: storing a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where a most significant p−q−e bits of the lower limit and the upper limit is derivable from the most significant p−q−e bits of the pointer value such that the upper and lower limits are anchored by the pointer value to reside within a memory region of size $2^n$, where n=q+e; employing mapping circuitry to map the lower limit mantissas and upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p; extending the lower limit mantissas and upper limit mantissas for each bounded pointer representation to create extended lower limit and upper limit mantissas comprising q+x bits, where a most significant x bits of each extended limit mantissa are mapping bits identifying which region the associated limit mantissa is mapped to; and employing determination circuitry to determine whether the accessible memory region defined for the second bounded pointer is a subset of the accessible memory region defined for the first bounded pointer by comparing the extended lower and upper limit mantissas for the first and second bounded pointers.

In a yet further example configuration, there is provided an apparatus for determining whether an accessible memory region defined for a second bounded pointer is a subset of an accessible memory region defined for a first bounded pointer, each bounded pointer having a pointer value and associated upper and lower limits identifying the accessible memory region for that bounded pointer, the apparatus comprising: storage means for storing a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where a most significant p−q−e bits of the lower limit and the upper limit is derivable from the most significant p−q−e bits of the pointer value such that the upper and lower limits are anchored by the pointer value to reside within a memory region of size $2^n$, where n=q+e; mapping means for mapping the lower limit mantissas and upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p; mantissa extension means for extending the lower limit mantissas and upper limit mantissas for each bounded pointer representation to create extended lower limit and upper limit mantissas comprising q+x bits, where a most significant x bits of each extended limit mantissa are mapping bits identifying which region the associated limit mantissa is mapped to; and determination means for determining whether the accessible memory region defined for the second bounded pointer is a subset of the accessible memory region defined for the first bounded pointer by comparing the extended lower and upper limit mantissas for the first and second bounded pointers.

BRIEF DESCRIPTION OF THE DRAWINGS

The present technique will be described further, by way of illustration only, with reference to examples thereof as illustrated in the accompanying drawings, in which:

FIGS. 12A and 12B illustrate two separate examples of relationships between two bounded pointers.

DESCRIPTION OF EXAMPLES

Figure 1:
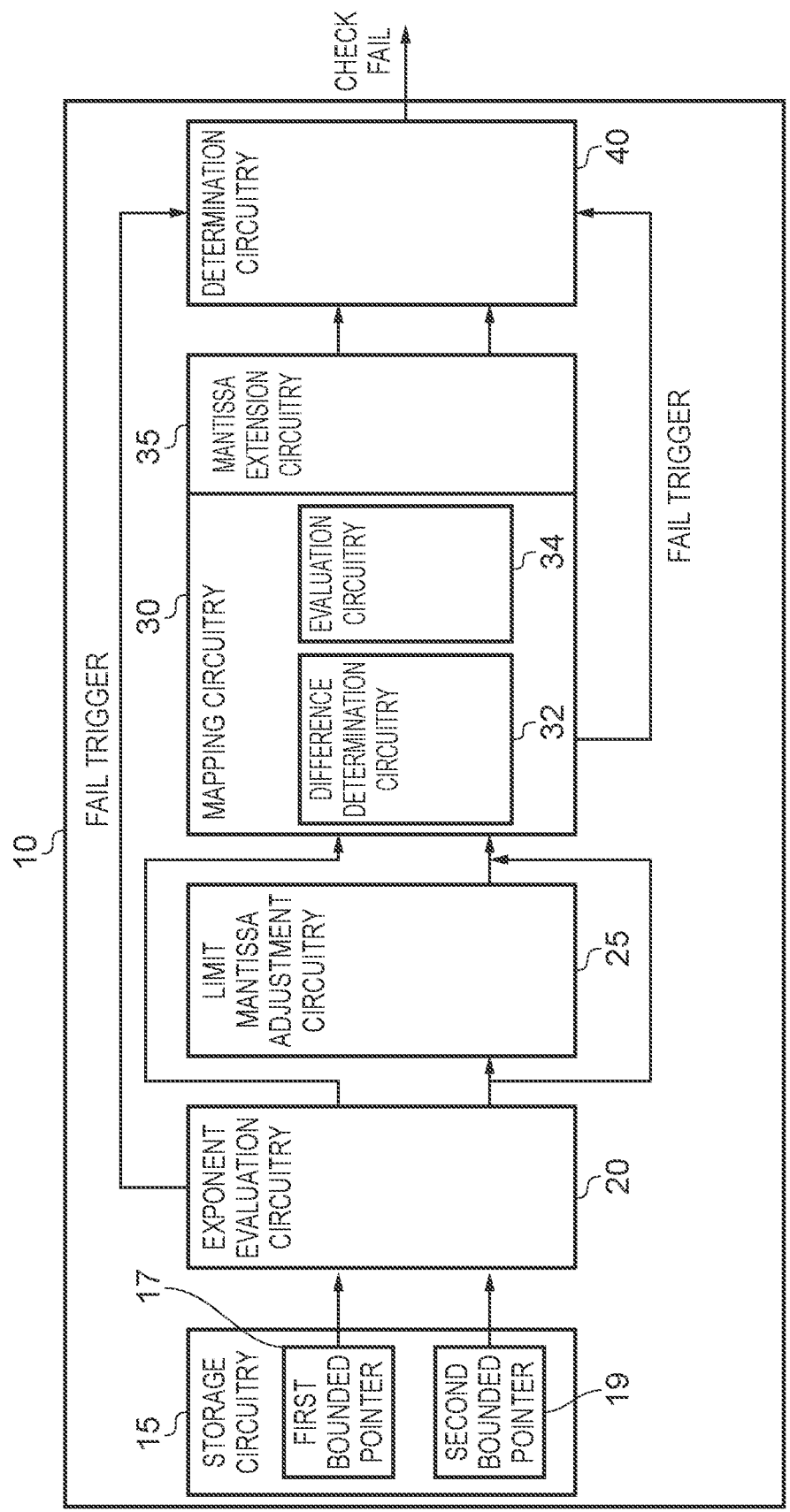
FIG. 1 is a block diagram of an apparatus in accordance with one example arrangement.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability. Alternatively, there may be some non-capability based architectures which allow bounded pointers to be defined.

Hence, an apparatus may have bounded pointer storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

As mentioned earlier, such an approach can provide for increased security when performing memory accesses, by enabling the addition of hardware enforced fine grained memory protection within address spaces.

In systems that employ such bounded pointers, it can be desirable to be able to check whether an accessible memory region defined for a second bounded pointer is a subset of an accessible memory region defined for a first bounded pointer. However, in typical systems the space available to define the bounded pointers is constrained, and it is often the case that the information specifying the range is stored in a compressed format, whereby the full range information can be determined by decompressing that information, typically with reference to the pointer value of the bounded pointer. However, performing such decompression for both of the bounded pointers in order to enable the above-mentioned check to be performed can give rise to significant performance and area impacts, and the techniques described herein provide a mechanism for performing such a check without fully decompressing the range information.

In one example arrangement, an apparatus is provided for performing such a check in connection with the first and second bounded pointers, where each bounded pointer has a pointer value and associated upper and lower limits identifying the accessible memory region for that bounded pointer. The apparatus has storage circuitry for storing a first bounded pointer representation and a second bounded pointer representation, where each bounded pointer representation comprises a pointer value having p bits and identifies the upper and lower limits in a compressed form by identifying a lower limit mantissa of q bits, an upper limit mantissa of q bits and an exponent value e. A most significant p−q−e bits of the lower limit and the upper limit is derivable from the most significant p−q−e bits of the pointer value, and as a result the upper and lower limits are anchored by the pointer value to reside within a memory region of size $2^n$, where n=q+e.

In order to perform the above-mentioned check, mapping circuitry is arranged to map the lower limit mantissas and upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p.

Mantissa extension circuitry is arranged to extend the lower limit mantissas and upper limit mantissas for each bounded pointer representation in order to create extended lower limit and upper limit mantissas comprising q+x bits. The most significant x bits of each extended limit mantissa is arranged to contain mapping bits identifying which region the associated limit mantissa is mapped to.

As a result, the extended lower and upper limit mantissas comprise sufficient information to be able to determine the relationship in the magnitudes of the upper and lower limits of each bounded pointer without needing to fully create those upper and lower limits. Instead, determination circuitry is used to determine whether the accessible memory region defined for the second bounded pointer is a subset of the accessible memory region defined for the first bounded pointer by comparing the extended lower and upper limit mantissas for the first and second bounded pointers.

Since the full upper and lower limits do not need to be recreated, this significantly reduces the size of the circuitry used to perform the necessary checks. However, the inventors realised that the lower and upper limit mantissa values of both bounded pointers could not be used "as is", since they contain insufficient information to enable the relative positions of the upper and lower limits of both bounded pointers to be determined. However, by using the mapping and mantissa extension techniques described above, it is possible to produce extended lower and upper limit mantissas which do comprise sufficient information to enable the relative positioning of the upper and lower limits to be determined without needing to fully recreate those upper and lower limits. As a result, the above described technique provides a reliable mechanism for determining whether the accessible memory region defined for a second bounded pointer is a subset of an accessible memory region defined for a first bounded pointer without fully recreating the upper and lower limits defining each accessible memory region.

In one example implementation the value of x is 2, and as a result the q+x bit address space comprises four regions of size $2^{n1}$. It has been found that this provides a sufficient amount of additional information to enable the relative positions of the upper and lower limits to be determined without fully recreating those upper and lower limits, and hence provides a particularly efficient mechanism for performing the above described check.

The mapping circuitry can take a variety of forms. However, in one example implementation, the mapping circuitry comprises difference determination circuitry to determine a difference value identifying a difference between the most significant p−q−e1 bits of the pointer value of the first bounded pointer and the corresponding most significant bits of the pointer value of the second bounded pointer, where e1 is the exponent value of the first bounded pointer representation. The mapping circuitry also has evaluation circuitry to perform a boundary check operation to evaluate whether an adjustment of any of the lower and upper limit mantissas for the first and second bounded pointer is required. The mapping circuitry is then arranged to determine which of the $2^x$ regions each upper and lower limit mantissa is mapped to in dependence on the difference value and the evaluation made by the evaluation circuitry.

Hence, in such an implementation, the difference determination circuitry is arranged to reference a certain number of most significant bits of both pointer values (where the number of bits is chosen dependent on the exponent value of the first bounded pointer representation), in order to get an initial indication of the separation between the pointer values in terms of the number of regions of size $2^{n1}$. However, the evaluation circuitry then performs a boundary check operation to evaluate whether any adjustment of the associated lower and upper limit mantissas would be required, and in particular would result in the associated limits moving from one region to an adjacent region. For example, due to the compressed nature of the upper and lower limit mantissas, it would be possible for the upper limit mantissa to have a smaller value than the lower limit mantissa. However, it is clear that the same cannot be true of the ultimate upper and lower limits produced from those mantissas since the upper limit will always be at a higher physical address than the lower limit, and the boundary check operation is used to detect such situations. Then, based on both the difference value determined by the difference determination circuitry and the boundary check operation performed by the evaluation circuitry, the mapping circuitry can determine which of the $2^x$ regions each upper and lower mantissa is mapped to, and that information can be used to determine the mapping bits for each extended limit mantissa. Once those mapping bits are added, then the resultant extended limit mantissas contain sufficient information to enable them to be compared directly to each other, in order to give an accurate indication of whether the accessible memory region defined for the second bounded pointer is a subset of the accessible memory region defined for the first bounded pointer.

In one example arrangement, the pointer value of the first bounded pointer is anchored to a chosen region from the $2^x$ regions, and the evaluation of the lower and upper limit mantissas for the first bounded pointer determines whether either of those lower and upper limit mantissas should be mapped to the chosen region or to an adjacent region to the chosen region.

In accordance with the earlier example where x is 2, and accordingly where there are four regions, then in one example implementation the chosen region is identified by mapping bits "01", and the mapping bits produced for each of the upper limit mantissa and lower limit mantissa for the first bounded pointer are one of "00", "01" or "10", depending on the evaluation performed by the evaluation circuitry.

With regard to the anchoring of the pointer value of the second bounded pointer, then in one example arrangement this is anchored to a determined region, where the relationship between the determined region and the chosen region is dependent on the difference value. The evaluation of the lower and upper limit mantissas for the second bounded pointer then determines whether either of those lower and upper limit mantissas should be mapped to the determined region or to an adjacent region to the determined region. Hence, the difference between the chosen region associated with the pointer value of the first bounded pointer and the determined region associated with the pointer value of the second bounded pointer is dependent on the difference value, and then the boundary check operation performed by the evaluation circuitry may cause certain lower or upper limit mantissas to be associated with an adjacent region. The end result is that a region is identified for each of the lower and upper limit mantissas of both bounded pointers, with that information being encoded as the mapping bits in the extended limit mantissas produced by the mantissa extension circuitry.

In one example implementation, when the difference value exceeds a predetermined value, the mapping circuitry is arranged to issue a fail trigger to the determination circuitry to cause the determination circuitry to output a check fail signal identifying that the accessible memory region defined for the second bounded pointer is not a subset of the accessible memory region defined for the first bounded pointer. In particular, if the difference value exceeds a certain amount, then it will be known that, irrespective of any adjustment that may be made by the evaluation circuitry, there is no prospect that the accessible memory region defined for the second bounded pointer will be a subset of the accessible memory region defined for the first bounded pointer, and accordingly the check fail signal can be issued without needing to perform the remainder of the check.

In one example implementation, there is an additional scenario during the operation of the mapping circuitry which may give rise to a fail trigger being issued. In particular, in the event that the mapping circuitry determines that at least one of the lower and upper limit mantissas for the second bounded pointer map to a region other than one of the $2^x$ regions, the mapping circuitry may be arranged to issue a fail trigger to the determination circuitry to cause the determination circuitry to output a check fail signal identifying that the accessible memory region defined for the second bounded pointer is not a subset of the accessible memory region defined for the first bounded pointer. In particular, the lower and upper limit mantissas for the first bounded pointer will always map to one of the $2^x$ regions, due to the choice of the chosen region in which the first bounded pointer is anchored, and accordingly if either of the lower or upper limit mantissas for the second bounded pointer does not map to one of those regions, then it is known that the check has failed.

In one example implementation, the apparatus further comprises exponent evaluation circuitry to determine whether the exponent value of the first bounded pointer representation is equal to or greater than the exponent value of the second bounded pointer representation. When the exponent value of the first bounded pointer representation is determined to be less than the exponent value of the second bounded pointer representation, the exponent evaluation circuitry may be arranged to issue a fail trigger to the determination circuitry to cause the determination circuitry to output a check fail signal identifying that the accessible memory region defined for the second bounded pointer is not a subset of the accessible memory region defined for the first bounded pointer. This enables another scenario where the check will definitely fail to be determined without needing to perform the full check process. In particular, if the exponent value of the first bounded pointer representation is less than the exponent value of the second bounded pointer representation, then it could be the case that the accessible memory region defined for the first bounded pointer is a subset of the accessible memory region defined for the second bounded pointer, but the reverse cannot be true, and accordingly a fail trigger can be raised immediately.

If the exponents of the first and second bounded pointers are the same, then it is known that the upper and lower limit mantissas of both bounded pointer representations can be used directly by the mapping circuitry. However, if the exponent value of the first bounded pointer representation is determined to be greater than the exponent value of the second bounded pointer representation, then in one example implementation the lower limit and upper limit mantissas for the second bounded pointer are altered in order to generate versions that are then used by the mapping circuitry. In particular, in one example implementation limit mantissa adjustment circuitry is provided for this purpose, in order to create altered lower limit and upper limit mantissas for the second bounded pointer for input to the mapping circuitry, the altered lower limit and upper limit mantissas being created taking into account the difference in the exponent values of the first and second bounded pointer representations. Through the operation of the limit mantissa adjustment circuitry, the altered lower limit and upper limit mantissas for the second bounded pointer are generated in a way that effectively normalises the second bounded pointer such that it is considered to have the same exponent as the first bounded pointer. This then ensures that the mapping circuitry can operate on the lower and upper limit mantissas of the two bounded pointers in exactly the same way as would be the case had the exponents actually been the same at the outset.

In one particular implementation, a value d is equal to the difference in the exponent values of the first and second bounded pointer representations, and each altered limit mantissa comprises a first portion formed of d least significant bits of the most significant p−q−e2 bits of the pointer value of the second bounded pointer, where e2 is the exponent value of the second bounded pointer representation, and a second portion formed of q-d most significant bits of the original limit mantissa. Hence, the altered lower limit and upper limit mantissas comprise two portions, where the first portion is formed from certain bits of the pointer value and the second portion is formed from certain bits of the original limit mantissa, hence recreating what the limit mantissas would have looked like had the exponent of the second bounded pointer representation been the same as the exponent value of the first bounded pointer representation.

There are a number of ways in which the boundary check operation can be performed by the evaluation circuitry. In one example implementation, the evaluation circuitry is configured, for each of the first and second bounded pointers, to determine a pointer mantissa for the pointer value by right shifting the pointer value based on the exponent value of the first bounded pointer representation to produce a shifted pointer value, and then taking a least significant q bits of the shifted pointer value to form the pointer mantissa. By creating a pointer mantissa, this enables checks to be performed using not only the upper and lower limit mantissas but also the pointer mantissa.

In particular, in one example implementation, the evaluation circuitry is configured to evaluate, for each bounded pointer, the location of the lower limit mantissa, the upper limit mantissa, and the pointer mantissa relative to a representative value less than the lower limit mantissa, in order to determine whether an adjustment of the lower limit mantissa or the upper limit mantissa is required. Through such a check it is possible to determine situations where either the lower limit mantissa or the upper limit mantissa would need incrementing or decrementing by $2^{n1}$ were those limit mantissas to be used to recreate the full limit value. However, as will be apparent from the earlier discussion, the full limit values are not in fact created, but that information is instead used to determine which region the limit mantissas should be associated with, and hence enable the associated extended limit mantissas to be created for use in the final comparison performed by the determination circuitry.

The representative value can take a variety of forms, but in one example arrangement, for each bounded pointer, the representative value is equal to the lower limit mantissa of that bounded pointer minus $2^{12}$.

Particular examples will now be described with reference to the Figures.

FIG. 1 is a block diagram of an apparatus 10 in accordance with one example configuration. Storage circuitry 15 is provided that can be used to store various types of data, and in particular, for the purposes of the present description, is used to store a first bounded pointer 17 and a second bounded pointer 19. The storage circuitry can take a variety of forms, but in one embodiment may comprise a set of registers, where each register can be arranged to store a bounded pointer. The circuitry illustrated in FIG. 1 is used to determine whether an accessible memory region defined for the second bounded pointer 19 is a subset of the accessible memory region defined for a first bounded pointer 17.

Figure 2:
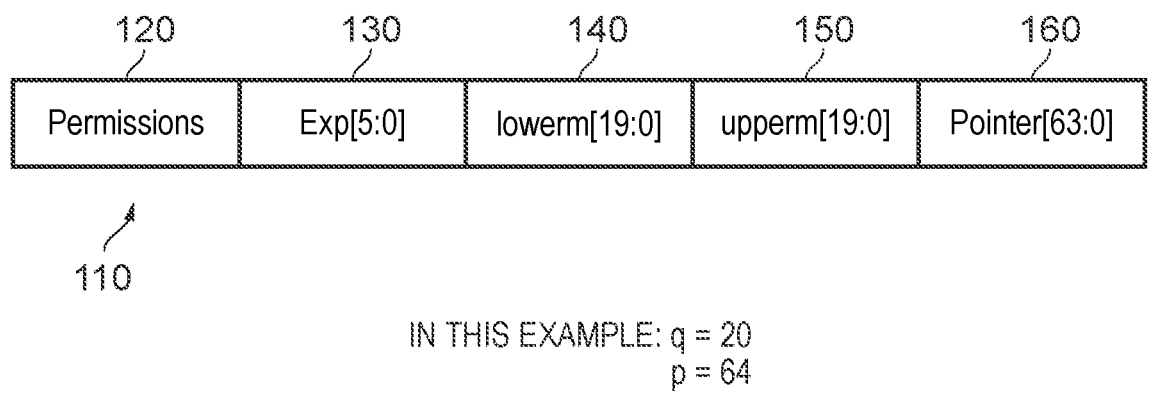
FIG. 2 illustrates an example of a fat pointer that may be used.

The format of bounded pointer representation used in one particular example implementation is shown in FIG. 2. The bounded pointer representation 110 includes a pointer value 160 that may be used to determine an address of a data value to be accessed. In the implementation shown in FIG. 2, the pointer is expressed in full within the bounded pointer representation 110, and comprises p bits. In this particular example, p is 64. The bounded pointer also includes range information which is expressed in a compressed form. In particular, a lower mantissa 140 and an upper mantissa 150 are provided that are used to determine the lower and upper bounds of the memory region that can be accessed using the pointer 160. The lower and upper mantissas 140, 150 are q bits in size, where q is less than p. In this particular example q is 20. The manner in which the actual lower and upper limits can be computed using the mantissa values 140, 150 will be described later with reference to FIG. 3.

The bounded pointer representation 110 shown in FIG. 2 also includes an exponent value 130, which in this example is formed from 6 bits. As will be discussed with reference to FIG. 3, the exponent value is used when seeking to determine the actual lower and upper limits of the memory region, and in particular is used to identify which bits of the pointer value 160 are used when recreating the lower and upper limits.

As also shown in FIG. 2, the bounded pointer representation 110 may include permissions information 120 (also referred to as restrictions information) which may define one or more permissions/restrictions on the use of the pointer. For example, the permissions could be used to restrict the types of instruction which may use the pointer, or the modes of operation of the apparatus in which the pointer can be used. The range information and permissions information may be considered to define capabilities within which the pointer is allowed to be used. When an attempt is made to use a pointer outside of the defined capabilities, an error can be triggered. As discussed earlier, the range information can be useful for example for ensuring that pointers remain within certain known bounds and do not stray to other areas of the memory address space which might contain sensitive or secure information.

Figure 3:
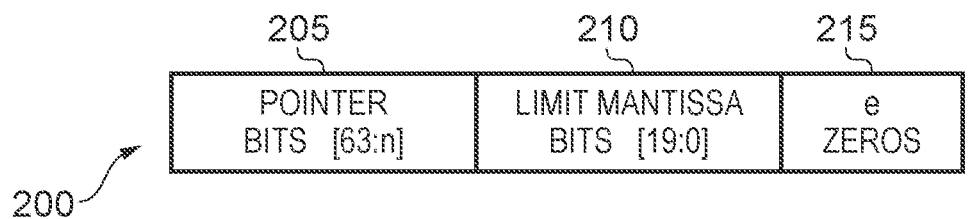
FIG. 3 illustrates how a lower or upper limit mantissa may be extended using certain bits of the pointer in order to create the equivalent full limit value, in accordance with one example.

FIG. 3 illustrates how a limit value may be recreated from the associated limit mantissa 140, 150 provided within the bounded pointer representation 110. A value n is set equal to q+e. As discussed earlier, q is the number of bits provided by the limit mantissa, and hence in the example of FIG. 2 is 20.

Further, e is the value of the exponent 130. It should be noted that it is the actual value of the exponent used here, and not the number of bits used to express the exponent.

Once n has been calculated, then the full limit value 200 can be recreated as shown in FIG. 3. In particular, a first portion 205 may contain a certain number of most significant bits of the pointer value 160, in particular those bits starting from the most significant bit of the pointer value down to bit n of the pointer value. Considering the example of FIG. 2, portion 205 may hence be formed from bits 63 to n of the pointer value 160. The second portion 210 of the limit value 200 then contains the q bits of the limit mantissa, i.e. the 20-bit limit mantissa when using the example of FIG. 2. A third portion 215 contains e zero bits.

Hence, it will be appreciated that when the exponent value is 0, then the limit mantissa 200 would include bits 63 to 20 of the pointer value, followed by the 20-bit limit mantissa (there would be no third portion 215). However, as the value of the exponent increases, less bits of the pointer value are used within the region 205, the 20-bit limit mantissa value occupies a more significant region of the limit value, and a number of 0s are then appended in the least significant bit positions to form the third region 215, where the number of 0s appended is equal to the value of the exponent.

Figure 4:
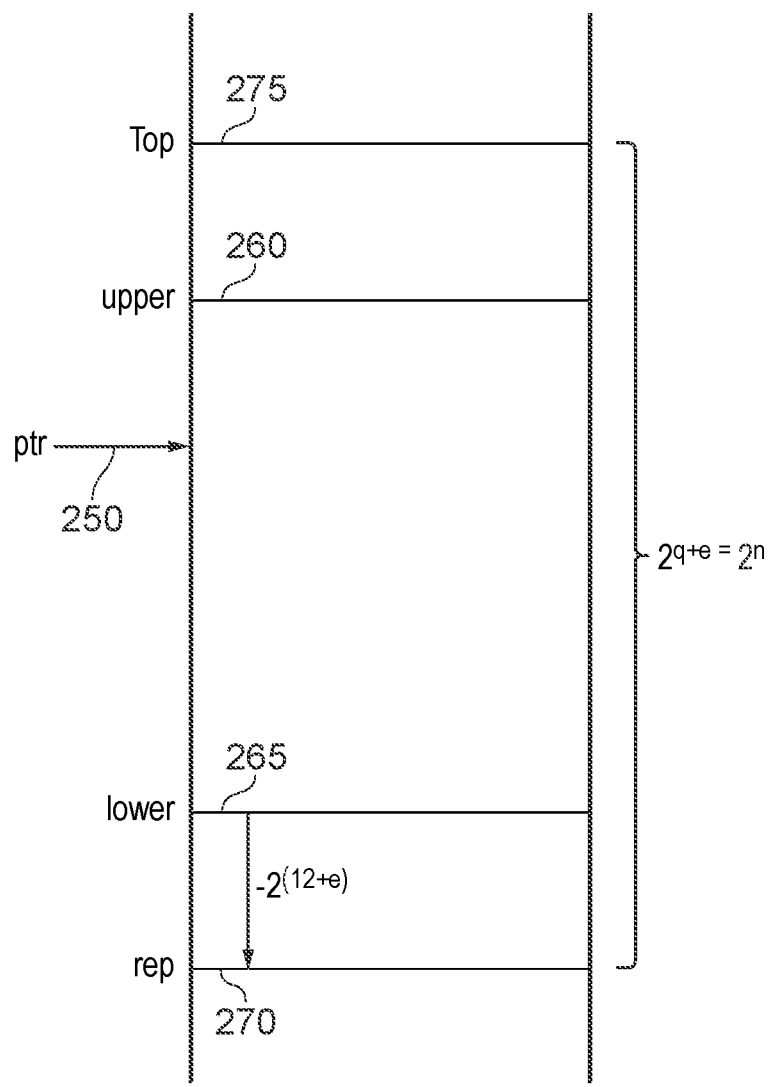
FIG. 4 illustrates the relationship between the upper and lower limits, the associated pointer value and a predetermined representative value, within an address space.

It will be appreciated from the above discussion that the lower limit and upper limits are derivable using the most significant p-n bits of the pointer value such that the upper and lower limits are anchored by the pointer value to reside within a memory region of size $2^n$. This is illustrated schematically in FIG. 4. In particular, FIG. 4 shows the accessible memory region for a bounded pointer within the memory address space. The actual accessible memory region is defined as the region between the upper limit 260 and the lower limit 265, these upper and lower limits being computed from the upper and lower limit mantissas 150, 140 using the approach discussed with reference to FIG. 3. The pointer value 250 will reside at a location between the upper and lower limits. Further, the upper and lower limits are constrained so that they will reside within a $2^n$ region shown in FIG. 4, extending from the top 275 down to the bottom 270. The bottom 270 may be associated with a representative value which is found by subtracting a predetermined amount from the lower limit 265. In one particular example, in the memory address space, the amount subtracted is $-2^{(12+e)}$. Within the 20-bit mantissa space, an equivalent representative value mantissa (also referred to herein as repm) can be formed by subtracting $-2^{12}$ from the lower mantissa 140.

Figure 5:
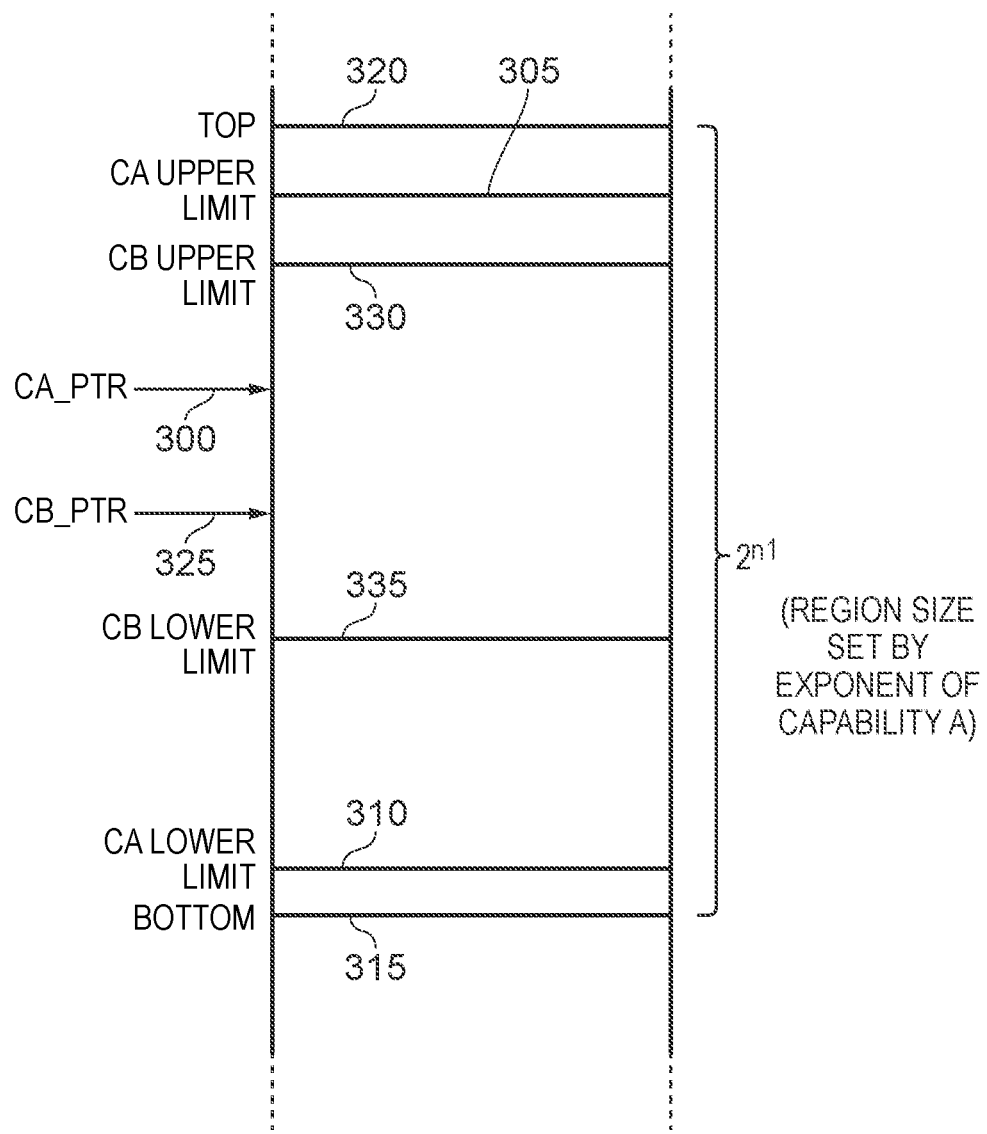
FIG. 5 illustrates the relationship between the upper and lower limits of two bounded pointers in a situation where it is determined that the accessible memory region for a second bounded pointer (CB) is a subset of the accessible memory region for a first bounded pointer (CA)

FIG. 5 schematically illustrates a particular example scenario where a first bounded pointer is formed by the capability CA and a second bounded pointer is formed by the capability CB. As discussed earlier, the apparatus described herein is used to determine whether an accessible memory region defined for a second bounded pointer is a subset of an accessible memory region defined for a first bounded pointer. The possible memory region for capability A is the region $2^{n1}$ shown in FIG. 5 that extends between the bottom address 315 and the top address 320, when n1 is the value of n calculated when using the exponent of capability A. As discussed earlier with reference to FIG. 3, n=q+e, and in this case the value of e is the value of the exponent of capability A. The actual accessible memory region for capability A is given by the range between the capability A lower limit address 310 and the capability upper limit address 305, which as discussed earlier with reference to FIG. 3 can be determined using the capability A pointer 300, the exponent value and the limit mantissas.

Similarly, the accessible memory region for capability B is the region extending between the upper limit 330 and the lower limit 335, these limits being computable from the capability B pointer value 325, its exponent value, and the relevant limit mantissas provided for capability B. It will be appreciated that FIG. 5 illustrates a "pass" case scenario, where it will be determined that the accessible memory region defined for the second bounded pointer (i.e. capability B) is a subset of the accessible memory region defined for the first bounded pointer (i.e. capability A).

However, it is very expensive in terms of performance and area to fully recreate the upper and lower limits of both bounded pointers using the approach of FIG. 3, merely to be able to check whether the accessible memory region for the second bounded pointer is a subset of the accessible memory region for the first bounded pointer. In particular, using the example representation of FIG. 2 it will be appreciated that that would require extending the 20-bit mantissas into the full 64-bit address space.

However, the check cannot merely be performed by using the limit mantissas directly. In particular, the memory address space can be considered to be formed of a series of consecutive $2^n$ sized regions, and it will be appreciated that the $2^n$ sized region that it is desired to associate with any particular bounded pointer need not align directly with one of those consecutive regions in memory, and in fact may straddle two such regions. However, due to the use of limit mantissas within the bounded pointer representation, a mechanism needs to be provided to identify such a scenario. In one implementation, this is implemented using a wrapping scheme. In particular, within the 20-bit mantissa space, it is possible for example for the upper limit mantissa to be represented by a smaller value than the lower limit mantissa. However, it is known that in reality the relationship between the upper and lower limits must be as shown in FIG. 4. With reference to the representative value mantissa repm, such situations can be detected when recreating the full limit value as shown in FIG. 3, and in particular based on the analysis of the upper limit mantissa, pointer mantissa and lower limit mantissa with reference to the repm value, it can be decided whether to increment or decrement any particular generated limit value by $2^n$. Examples of this approach will be described later with reference to FIGS. 11A to 11C.

However, whilst the use of the wrapping scheme to enable efficient representation of the upper and lower limits using the q-bit limit mantissas provides a very effective scheme for encoding bounded pointers, as discussed earlier it means that the limit mantissa bits cannot be directly used when seeking to perform the earlier discussed check as to determine whether an accessible memory region defined for a second bounded pointer is a subset of an accessible memory region defined for a first bounded pointer. However, as discussed earlier, it would be desirable not to have to recreate the entire 64-bit limit values in order to perform the check. The techniques described herein provide a mechanism for reliably performing the check without having to recreate the full limit values.

Returning to FIG. 1, this may be achieved using the circuit elements illustrated therein. The operation of the circuitry of FIG. 1 is also shown with reference to the flow diagram of FIGS. 6A and 6B.

Figure 6A:
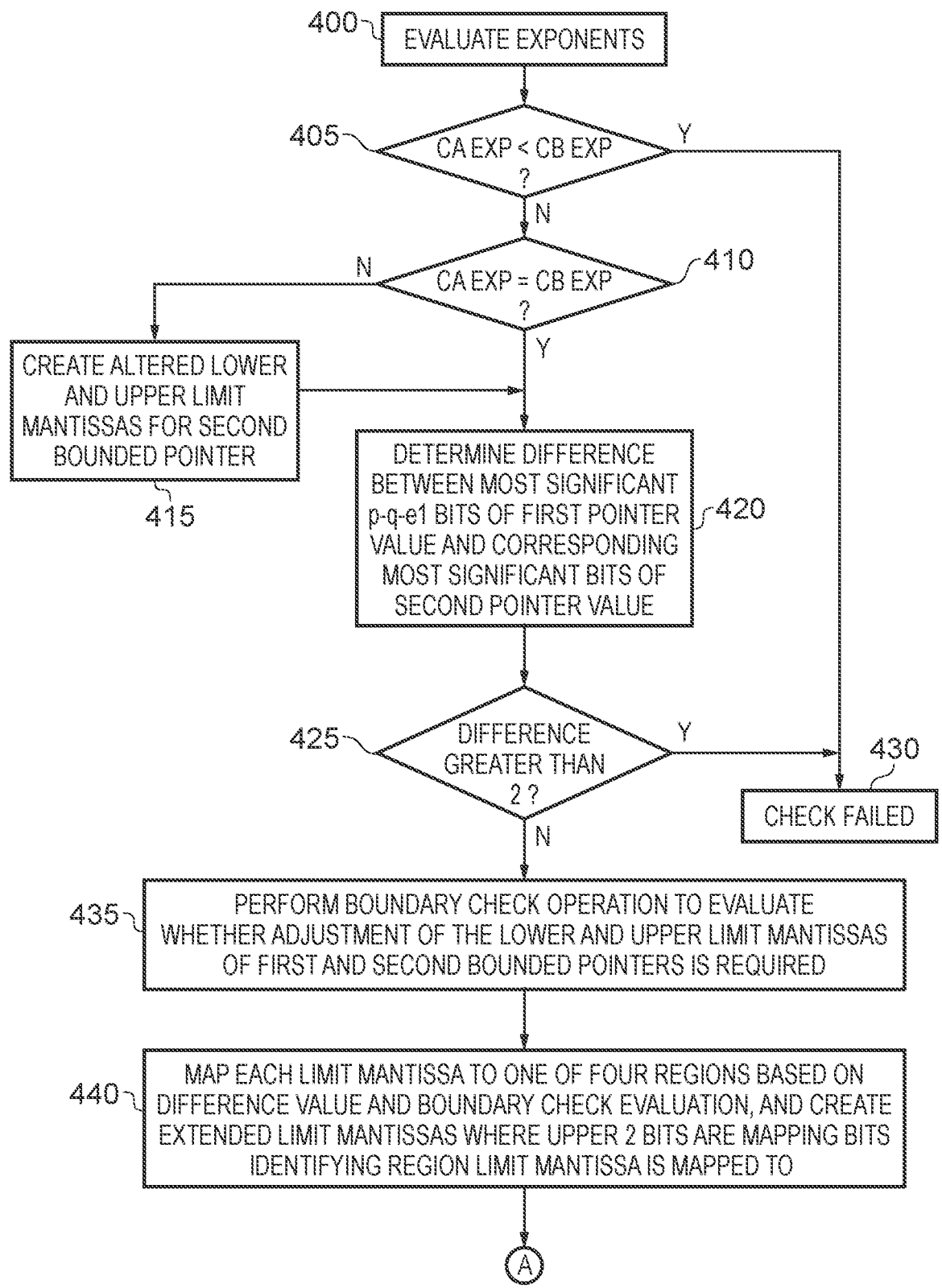
FIGS. 6A and 6B provide a flow diagram illustrating the operations performed in one example arrangement within the apparatus of FIG. 1 in order to determine whether the accessible memory region defined for a second bounded pointer is a subset of the accessible memory region defined for a first bounded pointer.

Firstly, at step 400, the exponent evaluation circuitry 20 in FIG. 1 can be used to evaluate the exponents of the first and second bounded pointers 17, 19. In particular, the exponent evaluation circuitry can determine whether the exponents are the same, or whether one is greater than the other. At step 405 of FIG. 6A, if it is determined that the exponent of capability A is less than the exponent of capability B then it is known that capability B is inherently larger than capability A, and hence it is not possible for the above mentioned check to pass. In particular, capability B's accessible memory region cannot be a subset of capability A's accessible memory region. Accordingly, the exponent evaluation circuitry can issue a fail trigger to the determination circuitry 40 to cause a check fail signal to be issued directly. This is indicated in FIG. 6A by the "yes" path from step 405 to step 430 indicating that the check has failed.

Assuming at step 405 it is determined that the exponent of capability A is not less than the exponent of capability B, it is determined at step 410 whether the two exponents are the same. If they are, then the process can proceed directly to step 420, and both of the capabilities can be forwarded to the mapping circuitry 30 shown in FIG. 1 "as is". However, if it is determined at step 410 that the two exponents are not the same, then this means that the exponent of capability A is larger than the exponent of capability B, and in this event capability B is passed to the limit mantissa adjustment circuitry 25, which is used to implement step 415 of FIG. 6A. In particular, the limit mantissa adjustment circuitry 25 is arranged at step 415 of FIG. 6A to create altered lower and upper limit mantissas for capability B, taking into account the difference between the exponents. This effectively normalises capability B such that for the remainder of the process it can be considered to have the same exponent as the exponent of capability A.

Figure 7:
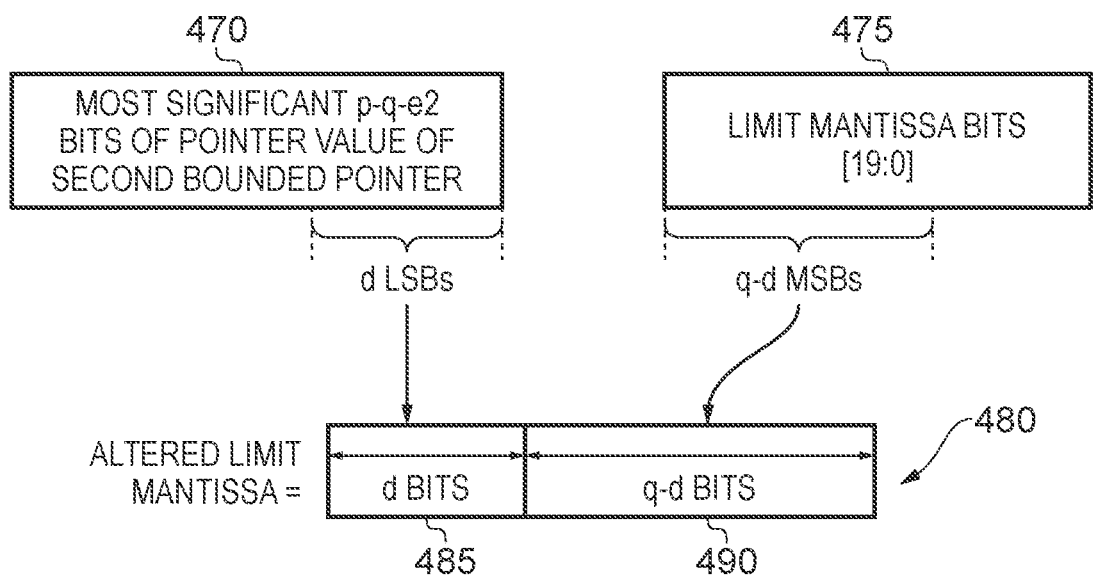
FIG. 7 is a diagram schematically illustrating the creation of altered lower and upper limit mantissas in one example implementation of step 415 of FIG. 6A.

The manner in which step 415 is implemented in one particular implementation is illustrated in FIG. 7. In the example of FIG. 7 e1 is the exponent of capability A and e2 is the exponent of capability B, and a value d is created equal to the difference between those two exponents. The most significant p−q−e2 bits 470 of the pointer value of capability B are identified, and then the d least significant bits are extracted as shown in FIG. 7 to form the most significant d bits 485 of the altered limit mantissa 480. The original limit mantissa bits 475 are then considered, and the most significant q−d bits of those limit mantissa bits are extracted to form the least significant q−d bits 490 of the altered limit mantissa 480. The process shown in FIG. 7 is performed for both the upper limit mantissa and lower limit mantissa of the capability B in order to produce altered upper and lower limit mantissas. As will be appreciated from FIG. 7, the mechanism performed here effectively shifts the mantissa bits upwards so as to identify the mantissa bits that would have been specified had capability B had the same exponent value as capability A.

Once step 415 has been performed, then the altered lower and upper limit mantissas for capability B can be forwarded from the limit mantissa adjustment circuitry 25 to the mapping circuitry 30. The upper and lower limit mantissas for capability A are passed "as is" to the mapping circuitry 30, and as discussed earlier this will also be the case for the upper and lower limit mantissas of capability B in the event that the "yes" path is followed from step 410, i.e. the exponents of both capabilities are the same.

At step 420, difference determination circuitry 32 within the mapping circuitry 30 is arranged to determine the difference between the most significant p−q−e1 bits of the first pointer value (i.e. the pointer value of capability A) and the corresponding most significant bits of the second pointer value (i.e. the pointer value of capability B).

At step 425, it is then determined whether this difference is greater than 2. If so, then it is known that the capabilities are too far apart for the accessible memory region of capability B to be a subset of the accessible memory region of capability A, and the process proceeds to step 430 where the check fails. Otherwise, the process proceeds to step 435, where evaluation circuitry 34 of the mapping circuitry 30 is arranged to perform a boundary check operation.

Figure 6B:
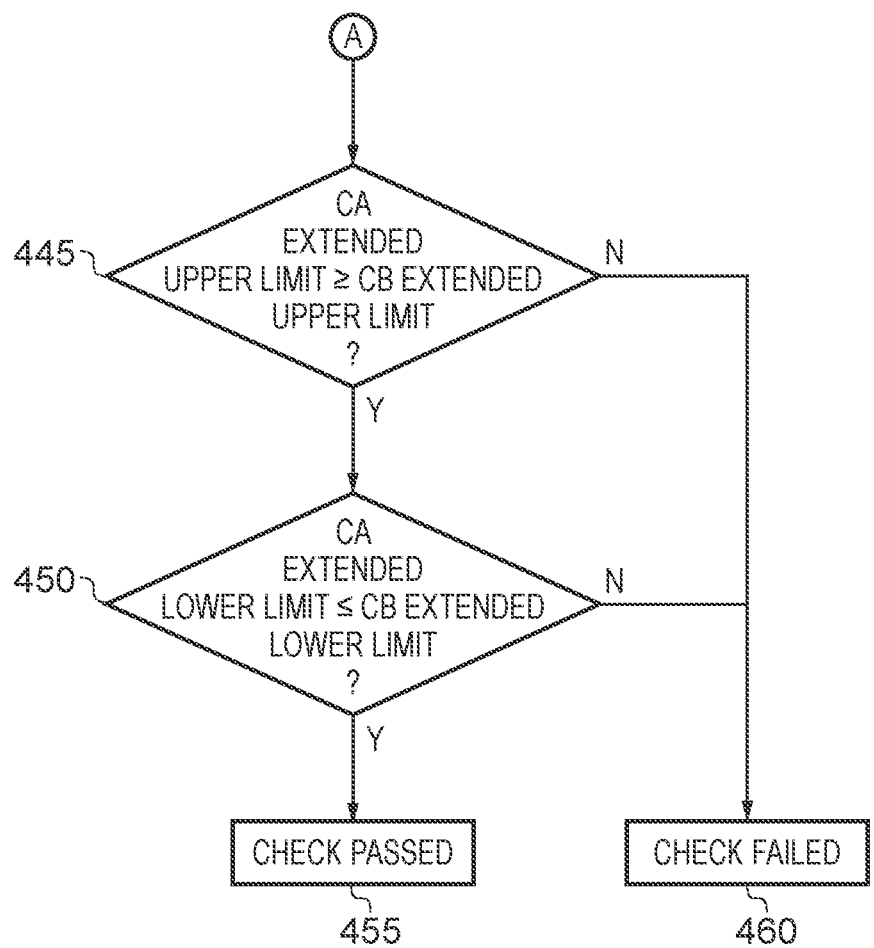
Figure 8:
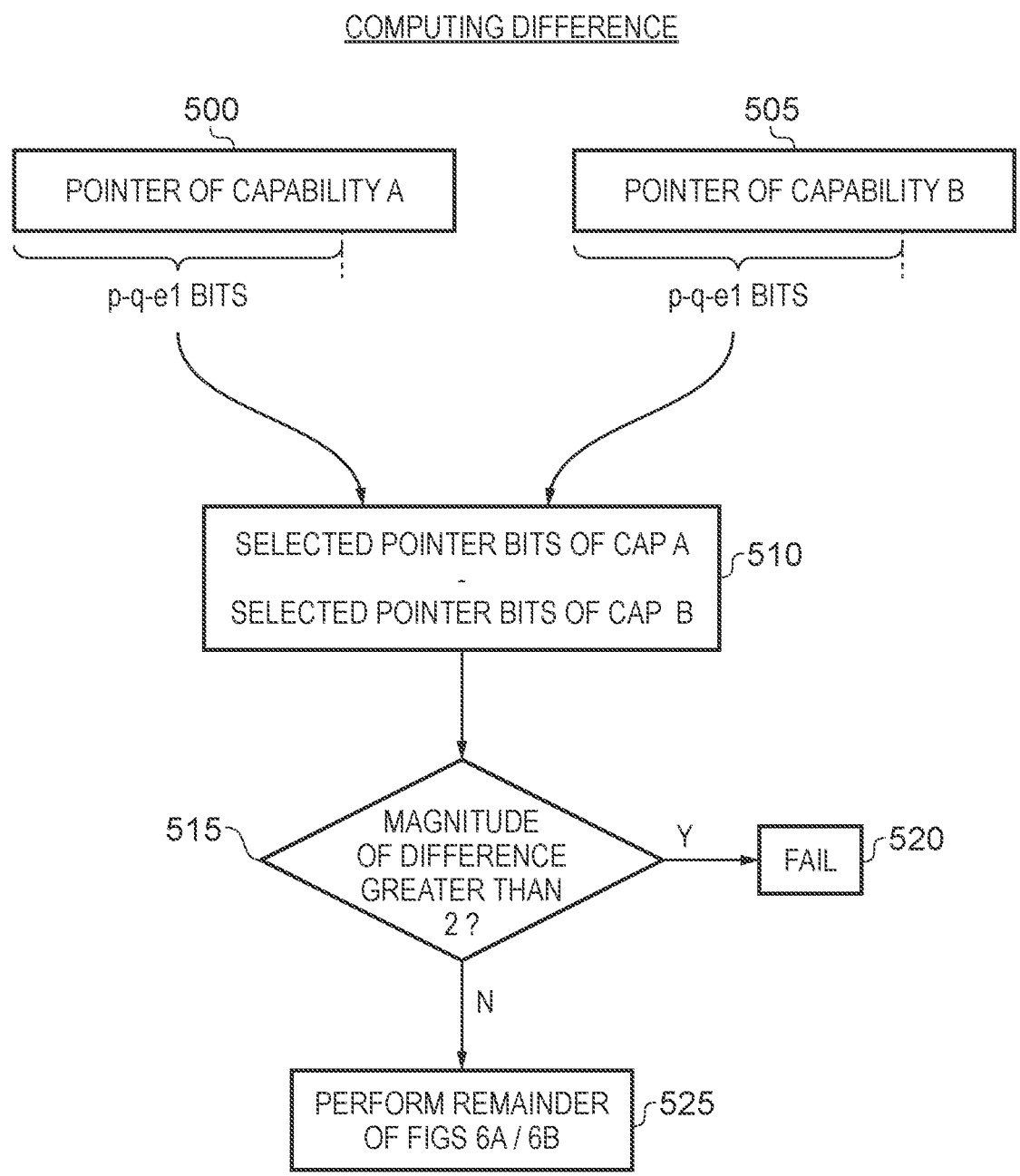
FIG. 8 is a diagram schematically illustrating the performance of steps 420 and 425 of FIG. 6A in accordance with one example.

The process of computing the difference is illustrated in more detail in FIG. 8. In particular, for each of the pointers of capabilities A and B 500, 505, the most significant p−q−e1 bits are extracted. It should be noted that it is the exponent of capability A that is used to identify the most significant bits to extract, whereafter at step 510 a subtraction is performed using the extracted most significant bits of each pointer. As illustrated by step 515, if the magnitude of the difference is greater than 2, then the process proceeds to step 520 where it is determined that the check has failed. Otherwise, the process proceeds to step 525 where the remainder of the process of FIGS. 6A, 6B is performed, starting at step 435.

Returning to FIG. 6A, then at step 435 the evaluation circuitry performs a boundary check operation to evaluate whether an adjustment of any of the lower or upper limit mantissas of the first and second bounded pointers (i.e. capabilities A and B) is required. This process will be discussed in more detail later, but essentially performs the earlier-described test to determine whether, were the full limit values to be recreated, it would be necessary to increment or decrement any of the limit values.

Figure 9:
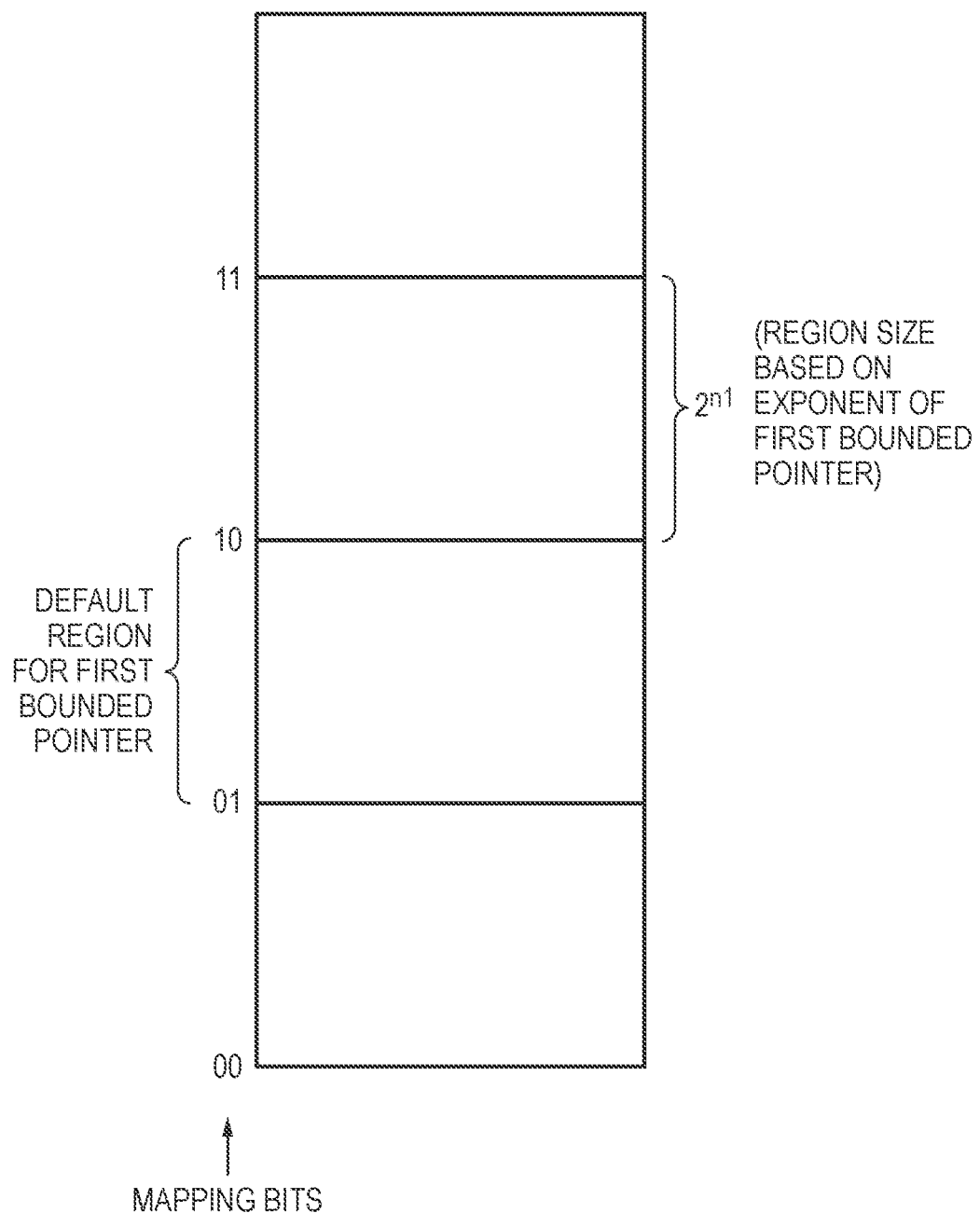
FIG. 9 schematically illustrates four address regions to which the upper and lower limit mantissas of both bounded pointers can be mapped, in accordance with one example arrangement.

However, as discussed earlier, in accordance with the technique described herein the full limit values are not recreated, so whilst step 435 will determine whether any such incrementing or decrementing would be needed, that incrementing or decrementing is not actually performed as such, and instead that information is used along with the difference value computed by the difference determination circuitry 32 during performance of step 440 of FIG. 6A. In particular, at step 440 each limit mantissa is mapped to one of a number of regions based on the difference value and the boundary check evaluation. In the particular example described herein, four regions are used as illustrated in FIG. 9, each region having a size $2^{n1}$, i.e. each of the regions has a size that is based on the exponent of capability A. The process by which such mapping takes place will be discussed later with reference to the flow diagrams of FIGS. 10A and 10B. However, in essence, each limit mantissa is extended by an additional two bits by the mantissa extension circuitry 35, those additional two bits forming the most significant bits of the extended limit mantissas, and encoding which of the four regions the associated limit mantissa has been mapped to by the mapping circuitry 30. A default region is used for capability A, which in the example of FIG. 9 is encoded as region 01. Due to the boundary check operation, it is possible that at least one of the limit mantissas of capability A may be mapped into an adjacent region, i.e. region 10 or 00, or indeed it may be determined that the limit mantissa should remain mapped to region 01.

For capability B, the default region for that capability is based on the difference value, which may be −2, −1, 0, +1 or +2 (as mentioned earlier if the magnitude of difference is greater than 2 then the check will have already failed at step 430). Again, due to the boundary check operation, it is possible for at least one of the limit mantissas of capability B to be mapped into an adjacent region.

It will be appreciated that, dependent on the actual difference, and any adjustments made by the boundary check operation, one or both of the limit mantissas of capability B may not be mapped into one of the four regions shown in FIG. 9. If that is the case, then a fail trigger can be issued directly from the mapping circuitry 30 to the determination circuitry 40 at that point, to cause a check fail signal to be issued.

However, for the purposes of the remainder of the discussion of FIGS. 6A and 6B, it will be assumed that each of the four limit mantissas have been mapped to one of the four regions shown in FIG. 9.

By the time step 440 has been completed, it will be appreciated that extended upper and lower limit mantissas will have been created for both capability A and capability B, those extended lower limit mantissas including two mapping bits as the most significant bits, identifying which of the four regions shown in FIG. 9 the associated limit mantissa is mapped to. At this point, the extended limit mantissas can be compared directly in order to perform the earlier-mentioned check. This is shown by steps 445 and 450 of FIG. 6B. In particular, at step 445 it is determined whether the extended upper limit mantissa for capability A is greater than or equal to the extended upper limit mantissa for capability B. If not, then the check fails at step 460. However, assuming this check is passed, then at step 450 it is determined whether the capability A extended lower limit mantissa is less than or equal to the capability B extended lower limit mantissa. If not, then again the check fails at step 460, but otherwise it is determined at step 455 that the check has passed, and the determination circuitry will issue a check pass signal. Both steps 445 and 450 of FIG. 6B are in one embodiment implemented by the determination circuitry 40 shown in FIG. 1.

Figure 10A:
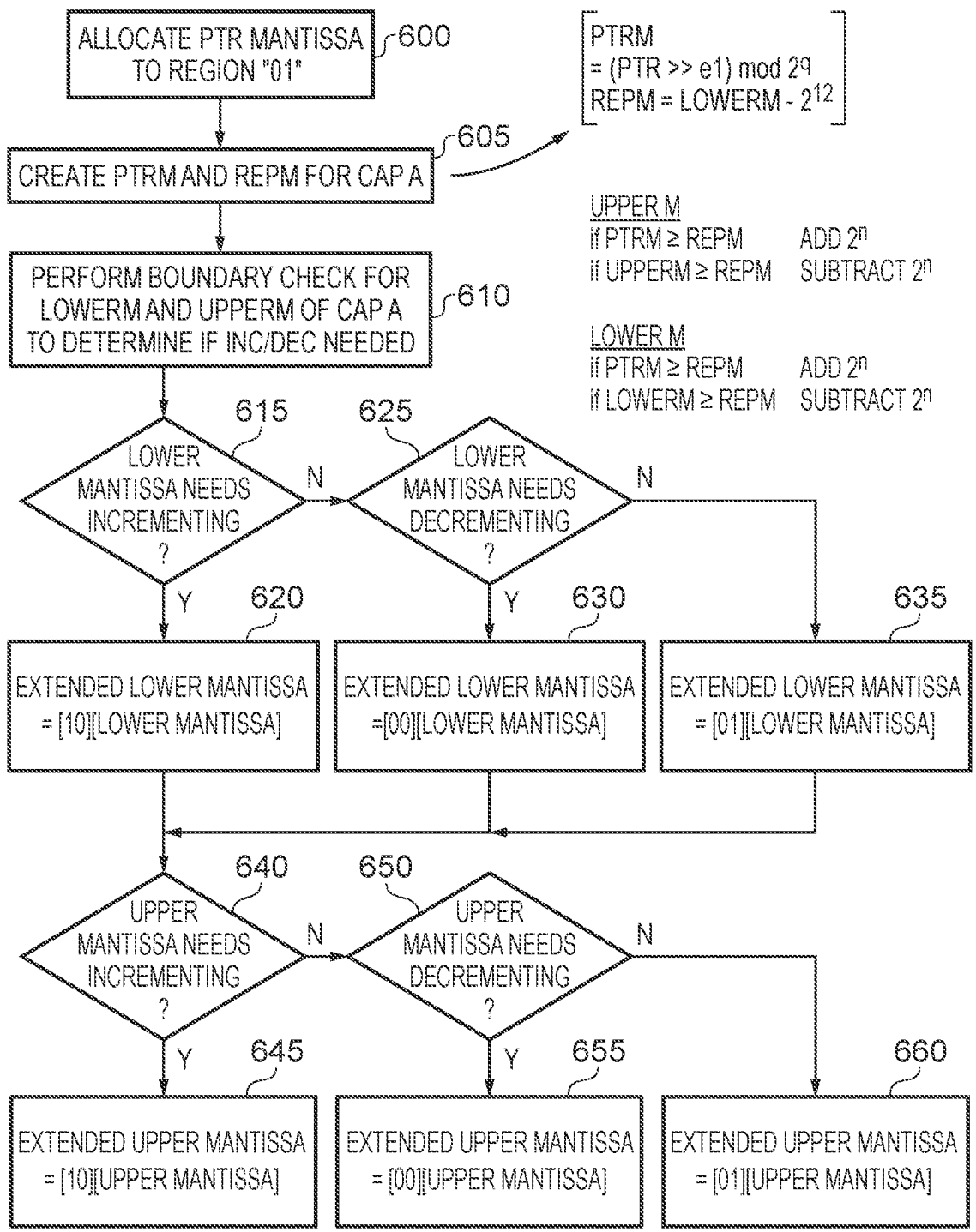
FIG. 10A is a flow diagram illustrating the boundary check operation of step 435 of FIG. 6A performed in relation to the limit mantissas of the first bounded pointer, in accordance with one example arrangement.
Figure 10B:
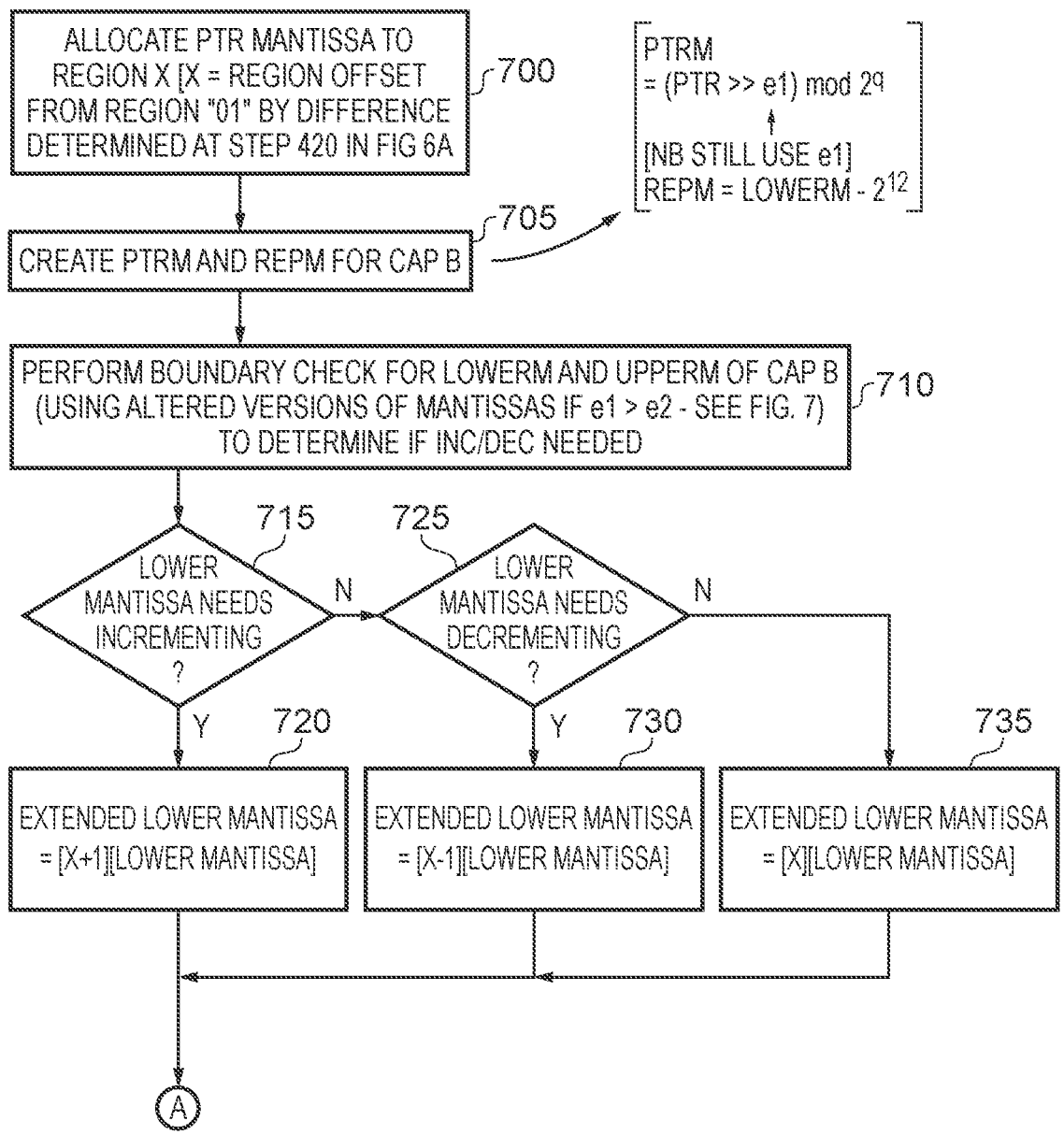
FIG. 10B is a flow diagram illustrating the boundary check operation of step 435 of FIG. 6A performed in relation to the limit mantissas of the second bounded pointer, in accordance with one example arrangement.

FIGS. 10A and 10B illustrate the process performed by the evaluation circuitry 34 and mantissa extension circuitry 35 of FIG. 1 in order to implement steps 435 and 440 of FIG. 6A, in one example implementation. FIG. 10A illustrates the checks performed with regards to the limit mantissas for capability A. At step 600, a pointer mantissa for capability A is allocated to region "01" shown in FIG. 9.

At step 605, the pointer mantissa and representative value mantissa for capability A are created. As shown in FIG. 10A, the pointer mantissa is determined by right-shifting the pointer value of capability A by the exponent value e1, and then taking the least significant q bits of the remaining value to form the pointer mantissa. The repm value is computed by subtracting $2^{12}$ from the lower limit mantissa.

At step 610, a boundary check operation is performed for the lower mantissa and upper mantissa of capability A to determine whether an increment or decrement would be needed were the full upper and lower limits to be recreated. The checks performed at step 610 are shown in FIG. 10A. In particular, it is determined whether the pointer mantissa is greater than or equal to repm and whether the upper mantissa is greater than or equal to repm. These two tests are used to determine whether to increment or decrement the upper mantissa. In particular, if both conditions are true no adjustment is made. If the pointer mantissa is greater than or equal to repm but the upper mantissa is not greater than or equal to repm, then the upper mantissa is incremented by $2^n$. Similarly, if the pointer mantissa is not greater than or equal to repm, but the upper mantissa is greater than or equal to repm, then the upper mantissa is to be decremented by $2^n$. A similar check is performed for the lower mantissa.

However, as discussed earlier, the full upper and lower limits are not to be recreated so the actual increments and decrements are not performed. Instead, at step 615, it is determined whether the lower limit mantissa needs incrementing, and if so an extended lower limit mantissa is created as shown in step 620 by prepending the value 10 to the front of the lower limit mantissa.

If the lower limit mantissa does not need incrementing, then it is determined at step 625 whether the lower limit mantissa needs decrementing, and if so an extended lower limit mantissa is produced at step 630 by prepending "00" to the lower limit mantissa.

If it is determined that the lower limit mantissa does not need decrementing, then it has been determined that the lower limit mantissa should remain as is, and accordingly the extended lower limit mantissa 635 is created by prepending "01" to the lower limit mantissa at step 635, i.e. to identify the default region indicated at step 600.

The same process is then performed for the upper limit mantissa, and in particular it will be appreciated that steps 640, 645, 650, 655 and 660 correspond to steps 615, 620, 625, 630 and 635, but are applied in relation to the upper limit mantissa rather than the lower limit mantissa.

FIG. 10B is a flow diagram illustrating the equivalent checks performed in relation to capability B. At step 700, the pointer mantissa for capability B is allocated to region X, where X is a region that is offset from region 01 by the difference determined at step 420 in FIG. 6A.

At step 705, the pointer mantissa and repm values for capability B are determined. As shown in FIG. 10B, the pointer mantissa is created in exactly the same way as the pointer mantissa for capability A was created, albeit using the pointer value for capability B. In particular, it is still the exponent value of capability A that is used to perform the right shift at this point. This is due to the fact that, as evident by steps 410 and 415 of FIG. 6A, either capability B's exponent will have been the same as capability A's, or the upper and lower limit mantissas will have been adjusted to take account of the difference between the exponents. Repm is then created by subtracting $2^{12}$ from the lower limit mantissa of capability B.

At step 710, the boundary check operation is performed for the lower and upper limit mantissas of capability B. As will be apparent from the earlier discussed step 415, altered versions of the upper and lower limit mantissas will be used at this point if the exponent of capability A was greater than the exponent of capability B. Other than the potential use of the altered versions of the mantissas, the tests performed at this point are the same as discussed earlier in relation to step 610 of FIG. 10A.

Steps 715 to 760 then correspond directly to steps 615 to 660 of FIG. 10A. However, it should be noted that the mapping bits are determined relative to the default region X, rather than region 01 as used in FIG. 10A.

At step 765, it is determined whether the mapping bits for at least one extended limit mantissa are out of range, i.e. do not identify any of the four regions 00, 01, 10 or 11. If so, then the check fails at step 770, whereas otherwise the process then proceeds to FIG. 6B at step 775, to perform the checks of the extended upper and lower limit mantissas of both capabilities.

Figure 11A:
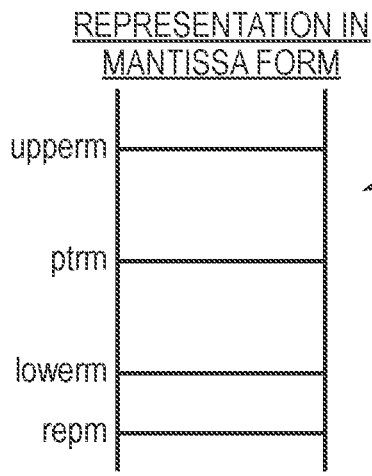
FIGS. 11A to 11C illustrate example boundary check scenarios that may arise.
Figure 11B:
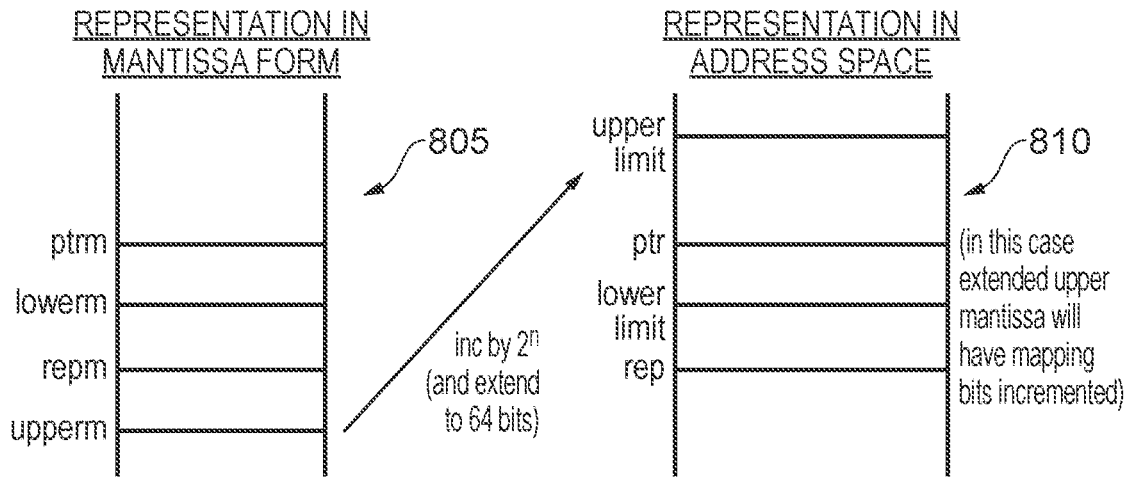
Figure 11C:
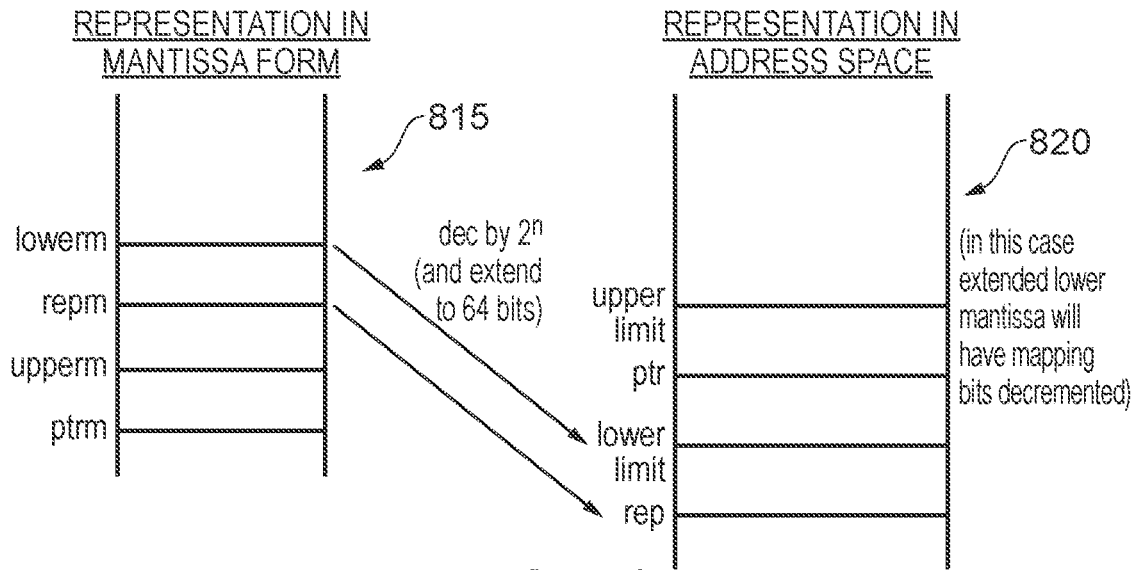

FIGS. 11A to 11C illustrate the adjustments that might be detected when performing steps 610, 710 of FIGS. 10A, 10B. FIG. 11A illustrates an example relationship 800 between the upper limit mantissa, pointer mantissa, lower limit mantissa and repm where it will be determined that no adjustment is needed. In particular, the relationship 800 is the same as would be expected for the ultimate upper and lower limits, pointer value and representative value in the full memory address space.

Representation 805 of FIG. 11B illustrates another possible relationship between the various mantissa values. In particular, it can be seen here that the upper mantissa is expressed by a value that is less than the lower mantissa, which does not represent the real world situation that would exist in the full address space, as indicated by the representation 810. By virtue of the checks performed at steps 610 or 710, it will be determined that the upper limit will need incrementing by $2^n$ when the full upper limit value is to be recreated (in addition to extending the value to the full 64-bit address space). As will apparent from FIGS. 10A and 10B, the actual incrementing does not take place, but instead the determination that the relevant mantissa needs incrementing will cause an incrementing of the mapping bits.

FIG. 11C illustrates a further example representation 815 where both the upper mantissa and the pointer mantissa are below repm. As will be apparent from the earlier discussed evaluation performed at step 610 or step 710, this will identify a situation where the lower mantissa needs decrementing by $2^n$ during the process of recreating the actual lower limit in the 64-bit address space, in order to produce the representation 820 within the full address space. As evident from the earlier discussed FIGS. 10A and 10B, the actual decrementing does not take place since the full limit values are not recreated, but the representation 815 does identify a scenario where the mapping bits for the lower limit mantissa need decrementing.

The following two specific examples are provided to illustrate how the above described techniques can detect pass and fail conditions when checking whether the accessible memory region defined for a second capability is a subset of the accessible memory region defined for a first capability.

In the following two examples, the first capability is referred to as capability M and the second capability is referred to as capability N. Pm, Em, Bm and Lm represent the pointer value, exponent value, lower limit mantissa and upper limit mantissa, respectively, of capability M, and Pn, En, Bn and Ln represent the pointer value, exponent value, lower limit mantissa and upper limit mantissa, respectively, of capability N.

In the first example, the elements of the two capabilities have the following values:

Pm:0e7e_0df7_0000_4001

Pn:0e77_ffff_e0cf_dd06

Em:20 (i.e. 32 in binary)

En:0b (i.e. 11 in binary)

Bm:e0df7

P Bn:c1013

Lm:97de7

Ln:3f02b

The pointer mantissas for both capability M and capability N are determined by performing a right shift using Em, and hence the pointer mantissa ptrm for capability M is e0df7 and the pointer mantissa ptrm for capability N is 7ffff.

Due to the exponent difference, both Bn and Ln need to be normalized, using the earlier described approach of FIG. 7. In this instance, after normalizing, both Bn and Ln are the same as the pointer mantissa of capability B, i.e. 7_ffff.

When computing the difference discussed with reference to FIG. 8, then the most significant p–q–e1 bits of Pm and Pn are identified and then subtracted. In this case, the difference=0e7−0e7.=0. This is an allowable magnitude difference, and accordingly the boundary check operation will be performed.

For capability M, repm is dfdf7, and for capability N repm is 7efff.

The following illustrates the boundary check comparisons performed for both capabilities:
M Capability:
   LIMIT COMPARISONS
      ptrm: e0df7>=dfdf7→+2^n
      limitm: 97de7>=dfdf7→0^n
        →MOVE LIMIT UP 2^n
   BASE COMPARISONS:
      ptrm: e0df7>=dfdf7→+2^n
      basem: e0df7>=dfdf7→-2^n
        →NO BASE CHANGE
N Capablity:
   LIMIT COMPARISONS
      ptrm: 7ffff>=7efff→+2^n
      limitm: 7ffff>=7efff→-2^n
        →NO BASE CHANGE
   BASE COMPARISONS:
      ptrm: 7ffff>=7efff→+2^n
      basem: 7ffff>=7efff→-2^n
        →NO BASE CHANGE As a result of the above, the extended limit mantissas become:
M base extended: 1_e0df7
M limit extended: 2_97de7
N base extended: 1_7ffff
N limit extended: 1_7ffff The performance of the check at steps 445 and 450 of FIG. 6B is then as follows:
N base extended (1_7ffff)>=M base extended (1_e0df7)? False! !! !
M limit extended (2_97de7)>=N limit extended (1_7ffff)? True!

Figure 12A:
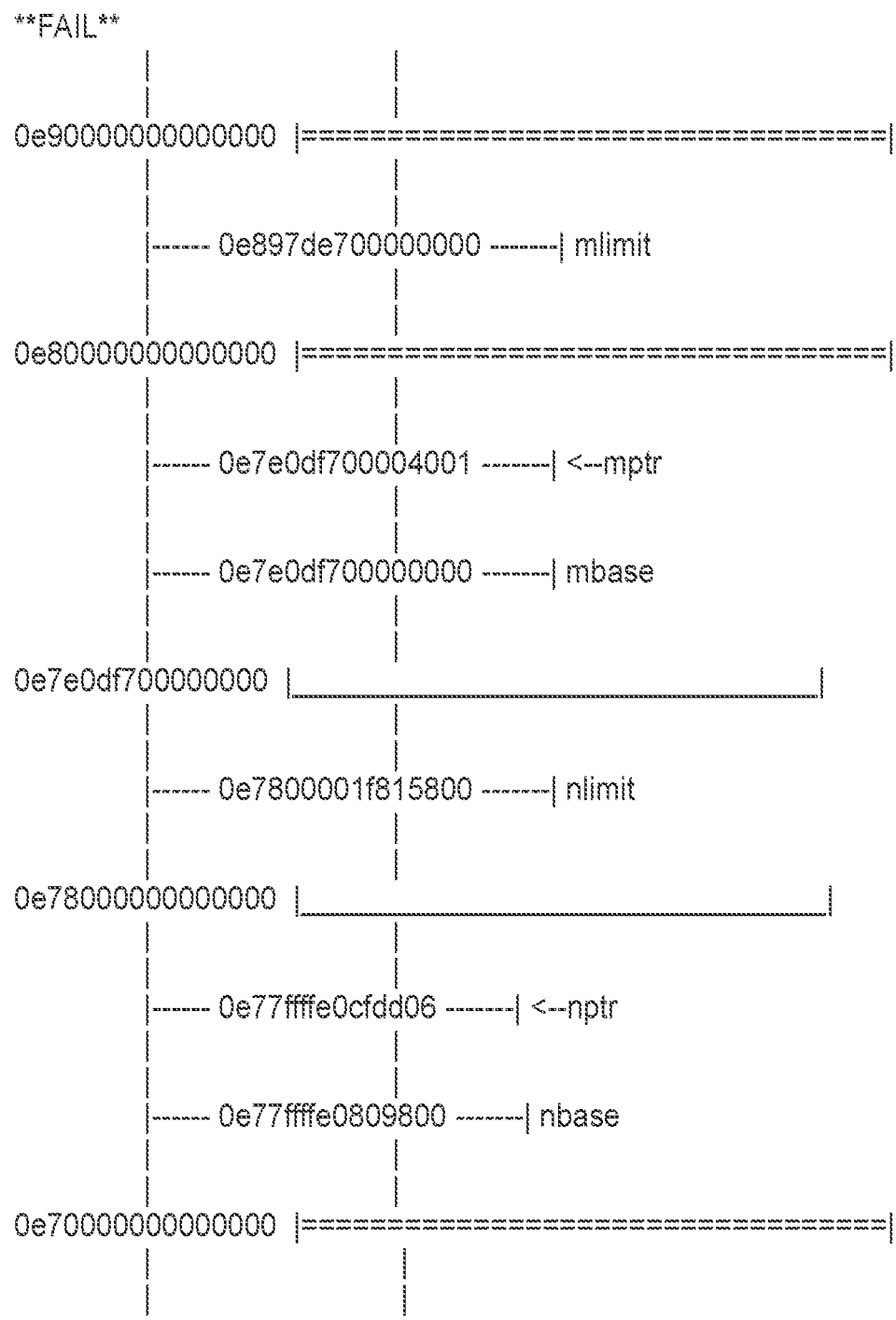

Therefore it can be determined that the check fails without needing to recreate the full limit values. FIG. 12A illustrates the equivalent full limit values, and demonstrates that the check does indeed fail.

In the second example, the elements of the two capabilities have the following values:
Pm:d803_d2d6_c6c2_1842
Pn:d808_8603_fff2_bfc0
Em:21
En:00
Bm:1e210
Bn:26b15
Lm:ee348
Ln:b5995

For capability M, ptrm=1e96b, whilst for capability N, ptrm=44301.

Again, it is necessary to normalize Bn and Ln, and they are both the same as ptrm for capability B, i.e. 44301.

The difference computation illustrated in FIG. 8 produces the difference=d80−d80=0. This is an allowable magnitude difference, and accordingly the boundary check operation will be performed.

The following illustrates the boundary check comparisons performed for both capabilities:
M Capablity:
   LIMIT COMPARISONS
      ptrm: 1e96b>=1d210→+2^n
      limitm: ee348>=1d210→-2^n
        →NO LIMIT CHANGE
   BASE COMPARISONS:
      ptrm: 1e96b>=1d210→+2^n
      basem: 1e210>=1d210→-2^n
        →NO BASE CHANGE
N Capablity:
   LIMIT COMPARISONS
      ptrm: 44301>=43301→+2^n
      limitm: 44301>=43301→-2^n
        →NO LIMIT CHANGE
   BASE COMPARISONS:
      ptrm: 44301>=43301→+2^n
      basem: 44301>=43301→-2^n
        →NO BASE CHANGE As a result of the above, the extended limit mantissas become:
M base extended: 1_1e210
M limit extended: 1_ee348
N base extended: 1_44301
N limit extended: 1_44301

The performance of the check at steps 445 and 450 of FIG. 6B is then as follows:
N base extended (1_44301)>=M base extended (1_1e210)? True!
M limit extended (1_ee348)>=N limit extended (1_44301)? True!

Therefore it can be determined that the check passes without needing to recreate the full limit values. FIG. 12B illustrates the equivalent full limit values, and demonstrates that the check does indeed pass.

From the above described examples, it will be appreciated that the presently described technique provides a particularly performance and area efficient technique for checking whether an accessible memory region defined for a second boundary pointer is a subset of an accessible memory region defined form a first bounded pointer, without needing to fully recreate the limit values for each bounded pointer that define the accessible memory region. In particular, extended limit mantissas can be created that incorporate mapping bits identifying which a number of consecutive regions should be associated with each limit mantissa, and those extended limit mantissas can then be compared directly in order to perform the check.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus to determine whether an accessible memory region defined for a second bounded pointer is a subset of an accessible memory region defined for a first bounded pointer, each bounded pointer having a pointer value and associated upper and lower limits identifying the accessible memory region for that bounded pointer, the apparatus comprising:

storage circuitry to store a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where the lower limit and the upper limit each have p bits, and where a most significant p−q−e (p minus q minus e bits) bits of the lower limit and the upper limit is derivable from the most significant p−q−e bits of the pointer value such that the upper and lower limits are anchored by the pointer value to reside within a memory region of size $2^n$, where n=q+e, where the least significant n bits of the upper limit is derivable from the q bits of the upper limit mantissa and the exponent value e, and where the least significant n bits of the lower limit is derivable from the q bits of the lower limit mantissa and the exponent value e;

mapping circuitry to map the lower limit mantissas and the upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p;

mantissa extension circuitry to extend the lower limit mantissas in the q+x bit address space and the upper limit mantissas in the q+x bit address space for each bounded pointer representation to create extended lower limit and upper limit mantissas comprising q+x bits, where a most significant x bits of each extended limit mantissa are mapping bits identifying which region the associated limit mantissa is mapped to; and determination circuitry to determine whether the accessible memory region defined for the second bounded pointer is a subset of the accessible memory region defined for the first bounded pointer by comparing the extended lower limit and upper limit mantissas for the first and second bounded pointers.

2. An apparatus as claimed in claim 1, wherein x is 2, such that the q+x bit address space comprises 4 regions of size $2^{n1}$.

3. An apparatus as claimed in claim 1, wherein the mapping circuitry comprises:

difference determination circuitry to determine a difference value identifying a difference between the most significant p−q−e1 bits of the pointer value of the first bounded pointer and the corresponding most significant bits of the pointer value of the second bounded pointer, where e1 is the exponent value of the first bounded pointer representation; and evaluation circuitry to perform a boundary check operation to evaluate whether an adjustment of any of the lower and upper limit mantissas for the first and second bounded pointer is required, wherein the pointer value of the first bounded pointer is anchored to a chosen region from the $2^x$ regions, and the evaluation of the lower and upper limit mantissas for the first bounded pointer determines whether either of those lower and upper limit mantissas should be mapped to the chosen region or to an adjacent region to the chosen region;

wherein the mapping circuitry is arranged to determine which of the $2^x$ regions each upper and lower limit mantissa is mapped to in dependence on the difference value and the evaluation made by the evaluation circuitry.

4. An apparatus as claimed in claim 3, wherein:
x is 2, such that the q+x bit address space comprises 4 regions of size $2^{n1}$;
the chosen region is identified by mapping bits "01", and the mapping bits produced for each of the upper limit mantissa and lower limit mantissa for the first bounded pointer are one of "00", "01" or "10", depending on the evaluation performed by the evaluation circuitry.

5. An apparatus as claimed in claim 3, wherein:
the pointer value of the second bounded pointer is anchored to a determined region, where the relationship between the determined region and the chosen region is dependent on the difference value; and
the evaluation of the lower and upper limit mantissas for the second bounded pointer determines whether either of those lower and upper limit mantissas should be mapped to the determined region or to an adjacent region to the determined region.

6. An apparatus as claimed in claim 3, wherein when the difference value exceeds a predetermined value, the mapping circuitry is arranged to issue a fail trigger to the determination circuitry to cause the determination circuitry to output a check fail signal identifying that the accessible memory region defined for the second bounded pointer is not a subset of the accessible memory region defined for the first bounded pointer.

7. An apparatus as claimed in claim 3, wherein in the event that the mapping circuitry determines that at least one of the lower and upper limit mantissas for the second bounded pointer map to a region other than one of the $2^x$ regions, the mapping circuitry is arranged to issue a fail trigger to the determination circuitry to cause the determination circuitry to output a check fail signal identifying that the accessible memory region defined for the second bounded pointer is not a subset of the accessible memory region defined for the first bounded pointer.

8. An apparatus as claimed in claim 3, wherein:
the evaluation circuitry is configured, for each of the first and second bounded pointers, to determine a pointer mantissa for the pointer value by right shifting the pointer value based on the exponent value of the first bounded pointer representation to produce a shifted pointer value, and then taking a least significant q bits of the shifted pointer value to form the pointer mantissa.

9. An apparatus as claimed in claim 8, wherein:
the evaluation circuitry is configured to evaluate, for each bounded pointer, the location of the lower limit mantissa, the upper limit mantissa, and the pointer mantissa relative to a representative value less than the lower limit mantissa, in order to determine whether an adjustment of the lower limit mantissa or the upper limit mantissa is required.

10. A data processing apparatus according to claim 9, wherein:
for each bounded pointer, the representative value is equal to the lower limit mantissa of that bounded pointer minus $2^{12}$.

11. An apparatus as claimed in claim 1, further comprising:
exponent evaluation circuitry to determine whether the exponent value of the first bounded pointer representation is equal to or greater than the exponent value of the second bounded pointer representation;
wherein when the exponent value of the first bounded pointer representation is determined to be less than the exponent value of the second bounded pointer representation, the exponent evaluation circuitry is arranged to issue a fail trigger to the determination circuitry to cause the determination circuitry to output a check fail signal identifying that the accessible memory region defined for the second bounded pointer is not a subset of the accessible memory region defined for the first bounded pointer.

12. An apparatus as claimed in claim 11, further comprising:
   limit mantissa adjustment circuitry responsive to the exponent value of the first bounded pointer representation being determined to be greater than the exponent value of the second bounded pointer representation, to create altered lower limit and upper limit mantissas for the second bounder pointer for input to the mapping circuitry, the altered lower limit and upper limit mantissas being created taking into account the difference in the exponent values of the first and second bounded pointer representations.

13. An apparatus as claimed in claim 12, wherein a value d is equal to the difference in the exponent values of the first and second bounded pointer representations, and each altered limit mantissa comprises a first portion formed of d least significant bits of the most significant p−q−e2 bits of the pointer value of the second bounded pointer, where e2 is the exponent value of the second bounded pointer representation, and a second portion formed of q−d most significant bits of the original limit mantissa.

14. A method of determining whether an accessible memory region defined for a second bounded pointer is a subset of an accessible memory region defined for a first bounded pointer, each bounded pointer having a pointer value and associated upper and lower limits identifying the accessible memory region for that bounded pointer, the method comprising:
   storing a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where the lower limit and the upper limit each have p bits, and where a most significant p−q−e bits (p minus q minus e bits) of the lower limit and the upper limit is derivable from the most significant p−q−e bits of the pointer value such that the upper and lower limits are anchored by the pointer value to reside within a memory region of size $2^n$, where n=q+e, where the least significant n bits of the upper limit is derivable from the q bits of the upper limit mantissa and the exponent value e, and where the least significant n bits of the lower limit is derivable from the q bits of the lower limit mantissa and the exponent value e;
   employing mapping circuitry to map the lower limit mantissas and the upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p;
   extending the lower limit mantissas in the q+x bit address space and the upper limit mantissas in the q+x bit address space for each bounded pointer representation to create extended lower limit and upper limit mantissas comprising q+x bits, where a most significant x bits of each extended limit mantissa are mapping bits identifying which region the associated limit mantissa is mapped to; and
   employing determination circuitry to determine whether the accessible memory region defined for the second bounded pointer is a subset of the accessible memory region defined for the first bounded pointer by comparing the extended lower limit and upper limit mantissas for the first and second bounded pointers.

15. An apparatus for determining whether an accessible memory region defined for a second bounded pointer is a subset of an accessible memory region defined for a first bounded pointer, each bounded pointer having a pointer value and associated upper and lower limits identifying the accessible memory region for that bounded pointer, the apparatus comprising:
   storage means for storing a first bounded pointer representation and a second bounded pointer representation, each bounded pointer representation comprising a pointer value having p bits, and identifying the upper and lower limits in a compressed form by identifying a lower limit mantissa of q bits, an upper limit mantissa of q bits and an exponent value e, where the lower limit and the upper limit each have p bits, and where a most significant p−q−e bits (p minus q minus e bits) of the lower limit and the upper limit is derivable from the most significant p−q−e bits of the pointer value such that the upper and lower limits are anchored by the pointer value to reside within a memory region of size $2^n$, where n=q+e, where the least significant n bits of the upper limit is derivable from the q bits of the upper limit mantissa and the exponent value e, and where the least significant n bits of the lower limit is derivable from the q bits of the lower limit mantissa and the exponent value e;
   mapping means for mapping the lower limit mantissas and the upper limit mantissas of the first and second bounded pointer representations to a q+x bit address space comprising $2^x$ regions of size $2^{n1}$, where n1 is the value of n determined when using the exponent value of the first bounded pointer representation, and q+x is less than p;
   mantissa extension means for extending the lower limit mantissas in the q+x bit address space and the upper limit mantissas in the q+x bit address space for each bounded pointer representation to create extended lower limit and upper limit mantissas comprising q+x bits, where a most significant x bits of each extended limit mantissa are mapping bits identifying which region the associated limit mantissa is mapped to; and
   determination means for determining whether the accessible memory region defined for the second bounded pointer is a subset of the accessible memory region defined for the first bounded pointer by comparing the extended lower limit and upper limit mantissas for the first and second bounded pointers.

\* \* \* \* \*